July 24, 1923.
H. W. TINKER, JR
1,462,992
VEHICLE SIDE CURTAIN CONSTRUCTION
Filed March 6, 1922      3 Sheets-Sheet 3
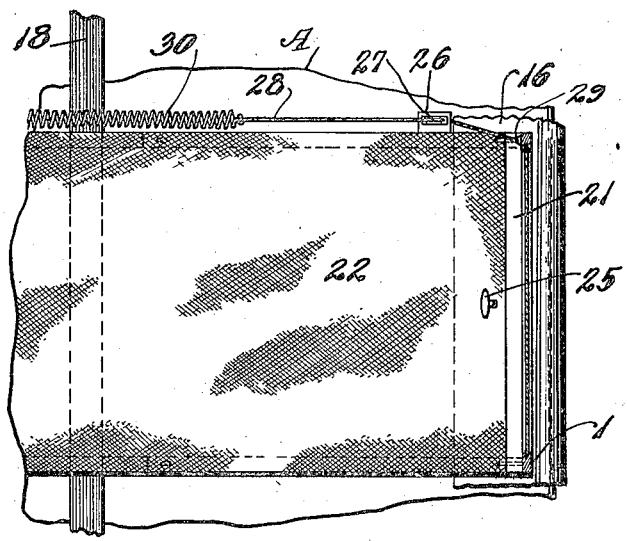
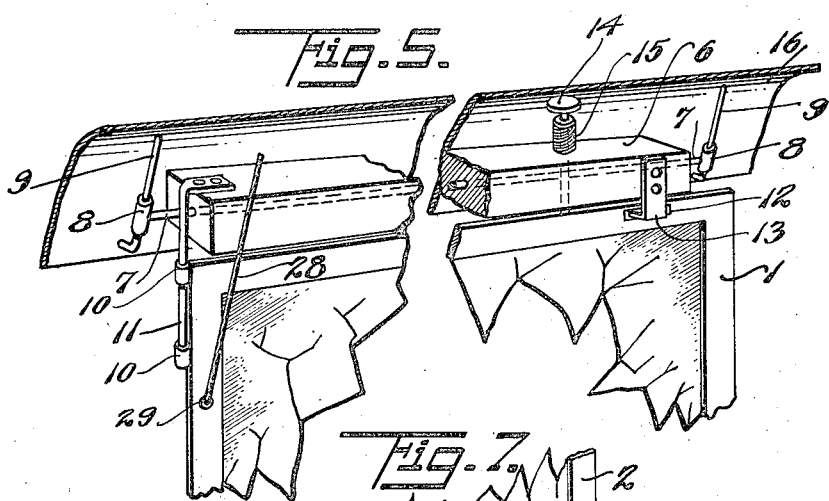
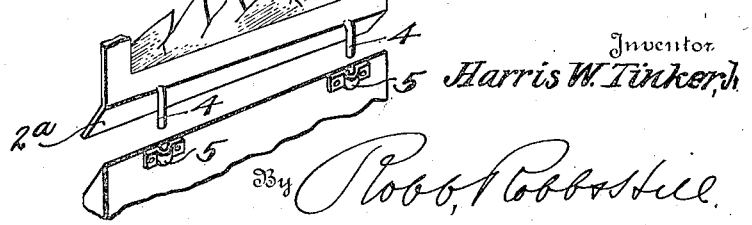

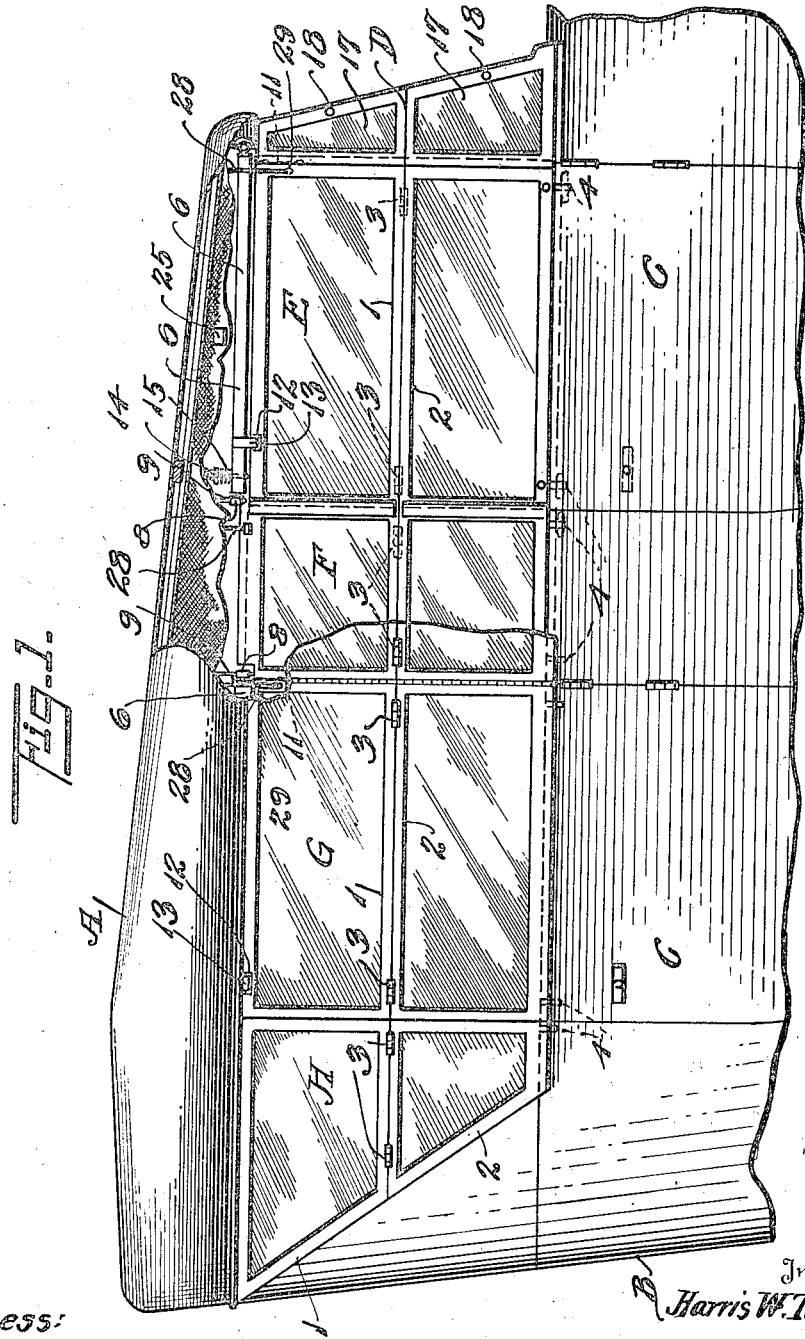

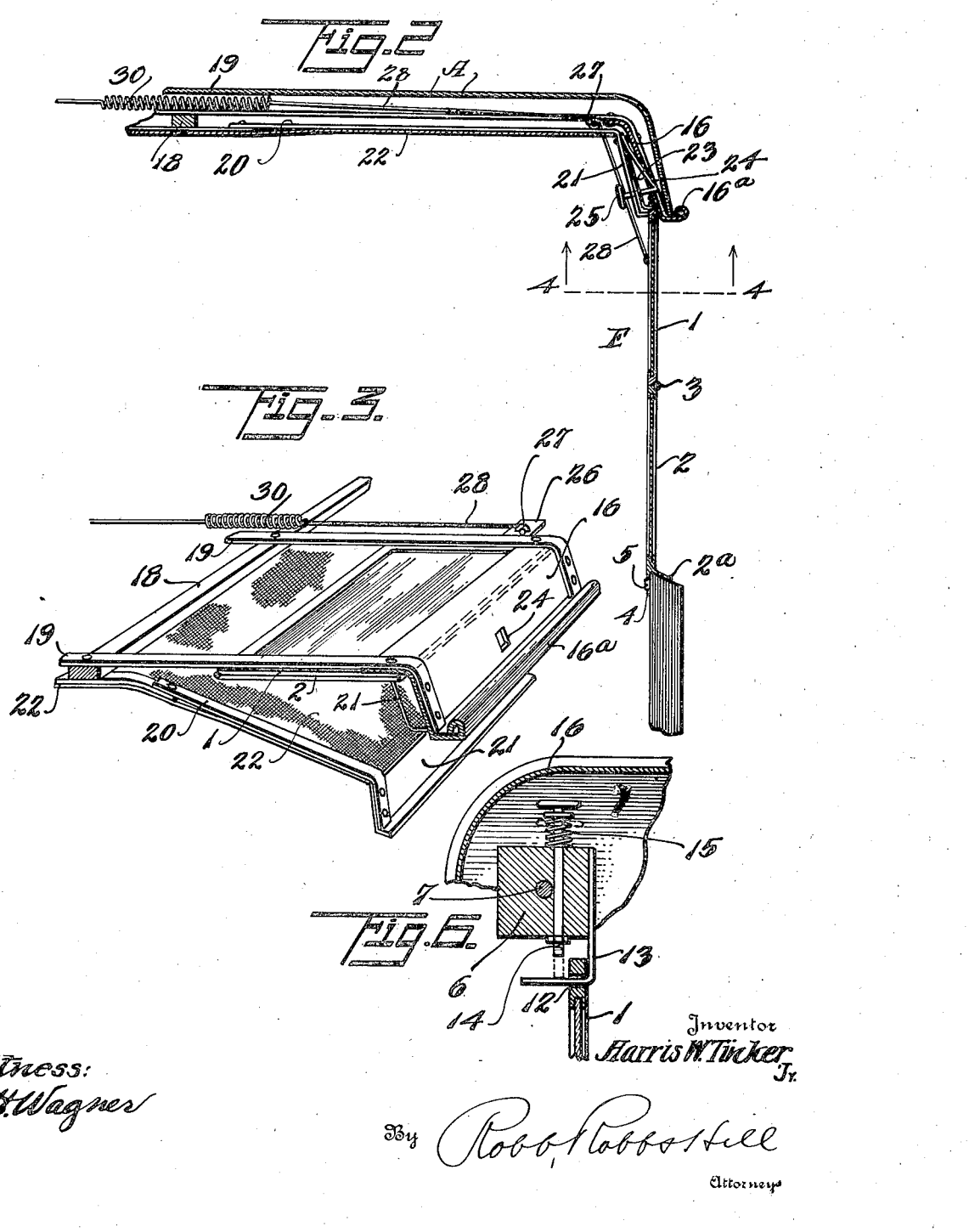

Patented July 24, 1923.

1,462,992

UNITED STATES PATENT OFFICE.

HARRIS W. TINKER, JR., OF BIRMINGHAM, ALABAMA.

VEHICLE SIDE-CURTAIN CONSTRUCTION.

Application filed March 6, 1922. Serial No. 541,366.

*To all whom it may concern:*

Be it known that I, HARRIS W. TINKER, Jr., a citizen of the United States, residing at Birmingham, in the county of Jefferson and State of Alabama, have invented certain new and useful Improvements in Vehicle Side-Curtain Constructions, of which the following is a specification.

The present invention relates to vehicle tops, and more particularly to a side curtain construction which embodies novel features of design whereby the side curtains can be quickly moved into and out of operative position without being detached from the top.

Further objects of the invention are to provide a side curtain construction which is especially adapted to be mounted upon the tops of motor vehicles and which when in operative position will effectively close the sides of the vehicle top and afford substantial and adequate protection against inclement and rainy weather.

The invention further contemplates a construction in which the side curtains have door sections which open and close with the doors, thereby facilitating ingress and egress from the vehicle when the curtains are in operative position.

A still further object of the invention is to provide a side curtain construction in which the curtains are folded against the vehicle top and concealed from view when not in use, although they are always in position to be lowered and can be quickly brought down into operative position whenever the weather conditions are such as to render the use of the curtains desirable.

These objects, and others, which will be apparent to those persons who are familiar with the present invention, can be obtained from the construction and arrangement of parts illustrated in the accompanying drawings and hereinafter described in detail, but I would have it understood that this construction and arrangement of parts is merely illustrative of the idea of the invention, and that changes may be made in the details and that the invention may be otherwise and variously embodied without departing from the spirit and scope thereof.

For a full understanding of the invention reference is to be had to the following description and accompanying drawings, in which:

Figure 1 is a side elevation of a vehicle top which is provided with side curtains constructed in accordance with the invention, the side curtains being shown in operative position and portions of the vehicle top and side curtains being broken away to illustrate more clearly the details of construction.

Figure 2 is a transverse sectional view through one side of the vehicle top, the curtains being shown as lowered into operative position.

Figure 3 is a perspective view of a fragmentary portion of the housing or cover for the side curtains which is mounted within the interior of the vehicle top and which is adapted to receive and conceal the side curtains when the latter are not in use.

Figure 4 is a horizontal sectional view on the line 4—4 of Figure 2 looking upwardly in the direction of the arrows.

Figure 5 is a fragmentary perspective view of the supporting device which is provided at the top of each of the curtain sections, looking at the same from the interior of the vehicle, portions being broken away and shown in section.

Figure 6 is an enlarged transverse sectional view through one of the curtain supporting bars.

Figure 7 is a fragmentary perspective view showing the fastening means employed for attaching the lower edges of the curtain members to the vehicle body when the curtains are lowered into operative position.

Corresponding and like parts are referred to in the following description and indicated in all of the views of the drawings by like reference characters.

For the purpose of illustration the side curtain of the invention is shown as applied to a vehicle top A which is of the conventional construction, and which is associated with a vehicle body B, said body being provided with the usual doors C. The top A is not intended to be folded and is of the usual concave design so that the interior thereof provides ample space for receiving the side curtains when they are not in use. The curtain construction is duplicated at each side of the vehicle so that a description of the curtain arrangement at one side of the vehicle will be sufficient. Each side curtain is subdivided into sections, depending upon the arrangement of the doors C in the body of the car. As indicated on Figure 1 of the drawings the side curtain includes a wind-shield section D, a front door section E, an intermediate section F, a rear door section G and a rear section H. Each of these sections, E, F, G and H includes an upper frame 1 and a lower frame 2, said frames being provided with a suitable transparency such as glass, celluloid, isinglass or the like, and being connected at their adjacent edges by hinges 3, so that the two frames can be folded against each other. The lower frames 2, as indicated more clearly by Figure 7, are provided with fastening members such as the hooks 4 which are adapted to engage and interlock with keepers 5 on the body of the car when the curtains are lowered into operative position. The lower edges of the lower frames 2 may also be provided with the flaps $2^a$ which project from the outside of the car and tend to shed the water and provide a weather tight connection.

The upper frames 1 of the sections E, F, G and H are suspended from the supporting bars 6 which are pivoted upon rods 7 extending longitudinally through the same. The extremities of the rods terminate in upright sleeves 8 which slide up and down upon upright guide bars 9 which are suitably arranged within the cover or case provided in the vehicle top to receive the side curtains when the latter are folded. The door sections E and G of the side curtains have a peculiar connection with their respective supporting bars 6 so that these sections are permitted to swing back and forth with the doors C of the vehicle as the said doors are opened and shut. This arrangement is shown in detail by Figure 5 and it will be observed that the end of the side curtain section which is over the hinges of the door is pivotally connected by the sleeves 10 to a substantially vertical hanger 11 which is suspended from one end of the respective supporting bars 6. This hanger and rod 11 form a vertical axis for the curtain section which is in substantial alignment with the axis of the door hinges so that the door and curtain section can swing in and out in unison. The opposite end of the door section of the side curtain is provided at the top thereof with an opening 12 which is adapted to be engaged by the downwardly projecting hooked end of an L-shaped bar 13 which is secured to the opposite end of the supporting bar 6. This member 13 provides a stop for the door section of the side curtain to limit the inward swinging movement thereof when the door is closed, and the hooked end of the member 13 which is normally in engagement with the opening 12 obviously assists in supporting the curtain section. When the curtain sections are folded it is desired to prevent disengagement of the opening 12 from the hook members 13, and for this purpose the corresponding supporting bars 6 are provided with plungers 14. One of these plungers is illustrated in detail in Figure 6, and it will be observed that it is normally held in a raised and inoperative position by a spring 15. In Figure 6 the parts are shown by full lines in the position assumed when the side curtains are lowered into operative position and the door section thereof is adapted to swing freely back and forth with the door as the door is opened and shut. However, upon the initial movement of folding the side curtain section the supporting bar 6 at the top thereof moves bodily upward with the result that the upper end of the plunger 14 is brought into engagement with the plate 16 and the plunger moved downwardly against the action of the spring 15, assuming the position indicated by dotted lines on Figure 6. The lower end of the plunger then engages the laterally projecting end of the hooked portion of the L shaped bar 13 so that it is impossible to disengage the opening 12 of the upper frame of the door section of the side curtain from the hooked end of the member 13. The parts are thus held in an interlocked position while the curtain section is folded.

The wind-shield sections D of the side curtains, instead of being formed of the upper and lower hingedly connected frames, are made of some suitable water-proof fabric, being povided with the windows 17. These wind-shield sections D may be connected to the ends of the wind-shield by conventional fastening means such as is indicated diagrammatically at 18, and when the side curtains are folded these fabric wind-shield sections D are first detached from the wind-shield and folded back against the adjacent front door sections E. They will then be folded between the two frames of the door section when the said door section is moved upwardly into inoperative position.

A suitable housing or cover is provided in the vehicle top A to receive and conceal the side curtains when the latter are folded and swung upwardly into inoperative position. Extending longitudinally of the vehicle top A at substantially the middle thereof is a bar 18. A series of cross pieces extend across the top of the bar 18 and have the extremities thereof extended downwardly at the sides of the vehicle top and connected by the longitudinally extending plates 16. These plates 16 are shown as having a substantially Z shaped cross section, the lower flanges thereof extending outwardly and being returned at $16^a$ for engagement with longitudinal rods which may form a part of the vehicle top. If there are no longitudinal rods to the vehicle top these returned portions 16ª will of themselves provide a stiffening means. As previously mentioned the upright guide bars 9 for the supporting bars 6 of the different curtain sections are secured to the plates 16. Extending transversely of the bar 18 and secured to the lower face thereof is a series of transversely extending spring strips 20. These strips 20 are arranged in pairs which are connected at their outer ends by the longitudinally extending plates 21. A pair of these strips is provided for each of the side curtain sections E, F, G and H and the strips are connected by a length of fabric 22 or other suitable material so that a flap is provided to conceal the curtain elements when the latter are collapsed and swung upwardly against the top of the vehicle. The plate 21 at the swinging end of each of the flaps is deflected downwardly from the spring arms 20 and carries a spring latch member 23 which is adapted to engage an opening 24 in the adjacent plate 16 to lock the flap in a closed position. The latch member is provided with a handle 25 by means of which it can be disengaged from the opening 24 when it is desired to pull the flap downwardly. The resiliency of the spring strips 20 normally tends to swing the cover flap upwardly into operative position and to bring the latch 23 into engagement with the opening 24.

At convenient points between adjacent cover flaps certain of the upper cross pieces 19 are provided with plates 26 upon which pulleys 27 are journalled. Tension wires 28 pass around these pulleys, being carried downwardly and secured to the curtain sections at 29. The opposite ends of the wires extend toward the center of the top and the wires are provided with springs 30 which normally maintain the same under tension, and the pull of the wires upon the upper frames 1 of the curtain sections normally tends to swing the same inwardly and to facilitate the folding of the curtains. By reference to Figure 5 of the drawings it will be observed that these tension wires 28 are connected to the edges of the door sections E and G of the curtains in substantial alignment with the axes of the door hinges so that they do not interfere with the movement of the curtain sections with the doors when the latter are opened and shut. The wires 28 are carried downwardly between adjacent cover flaps, as indicated by Figure 4 of the drawings, so that they do not interfere with the arrangement and manipulation of these cover flaps.

If it is desired to lower the side curtains into operative position, the operator successively releases the latches 23 of the several flaps by pulling outwardly on the handle 25, after which the flaps are swung or flexed downwardly as indicated by Figure 3, to permit of the folded frames 1 and 2 being swung downwardly. As soon as they are released the cover flaps will spring backwardly into their original positions, and bring the latches 23 into engagement with the openings 24. The frames 1 and 2 of the released side curtain sections are unfolded and the latch members or hooks 4 of the lower frames 2 brought into a firm engagement with the keepers 5 of the vehicle body. It will be understood that the interlocking engagement of these members 4 with the keepers 5 is such as to hold the parts firmly together until they are forcibly and intentionally released. In bringing the fastening members 4 into engagement with the keepers 5 the supporting bars 6 are moved downwardly a sufficient amount to release the plungers 14 and permit the said plungers to move upwardly into inoperative position. The hooked ends of the L-shaped bars 13 then have only a loose engagement with the openings 12 of the upper frames 1 of the door sections and, as previously explained, the door sections of the side curtains can swing back and forth with the doors C of the vehicle body. The wind-shield section D which is formed of flexible material must, of course, be swung to the front and attached to the wind-shield by the fastening members 18.

When it is desired to fold the side curtains, the wind-shield sections D are disengaged from the wind-shield and swung rearwardly against the adjacent door sections E of the curtains. The cover flaps for the successive curtain sections are then unlatched and swung downwardly to admit of the upper and lower frames of the curtain sections being folded against each other and swung upwardly against the vehicle top, as indicated by Figure 3. The tension wires 28 tend to swing the upper frames 1 of the curtain sections inwardly and the cover flaps will then engage the lower frames 2 of the curtain sections to swing the latter upwardly. The inherent resiliency of the spring strips 20 tends to close the flaps as soon as they are released, and the latches 23 lock the cover flaps closed as soon as they are returned to their original positions. In the act of folding the curtain sections E, F, G and H the supporting bars 6 are moved upwardly upon the guide bars 9 and then revolved upon the rods 7. The upward movement of the supporting bars 6 brings the plungers 14 into engagement with the plates 16 and moves the plungers into operative position, thereby causing them to close the open mouths of the hooked ends of the L-shaped bars 13 so that the upper frames 1 of the curtain sections cannot be disengaged from the hooked bars 13 while the curtain sections are being folded or unfolded. The frame members 1 and 2 of the sections may be formed of any suitable material, although where a substantial construction is desired they may be of a light wood or metal formation so that the transparency may be made of glass.

Having thus described my invention what I claim as new and desire to secure by Letters Patent is;

1. The combination with a vehicle top and a body having conventional doors, of side curtains movable into and out of operative position and comprising horizontally foldable door sections provided with means for connection to a door for swinging movement therewith, and permanent supporting means for said sections adjacent the top and constructed to permit of folding of the sections beneath the top and providing a vertical axis for the sections to permit a swinging thereof with the door as the latter is opened or closed.

2. The combination with a vehicle top and a body having conventional doors, of a side curtain comprising door sections which are formed in horizontally hinged frames adapted to collapse against each other and be folded against the top or permitted to swing into operative position, means for connecting said frame to a door section for swinging movement therewith, means for retaining said frames in inoperative folded position, permanent supporting means for the frames pivoted adjacent the vehicle top, and a connection between said supporting means and frames to permit swinging movement of the latter thereon in the opening and closing of the doors.

3. The combination with a vehicle top and a vehicle body having the usual doors, of side curtains movable into and out of operative position and including special door sections, said door sections being formed of upper and lower horizontally hinged frames which are adapted to be collapsed against each other, means for connecting the upper frame to the vehicle top so that it can swing about either a horizontal axis to fold or a vertical axis for permitting the door section to swing with the door as the latter is opened and closed, and means for holding the section in either operative or inoperative position.

4. The combination with a vehicle top and a vehicle body having the usual doors, of side curtains movable into and out of operative position and including special door sections, said door sections comprising upper and lower horizontally hinged frames, a supporting bar for each door section, said supporting bars being mounted to turn about horizontal axes to permit of the frames being collapsed against the vehicle top, a hanger pendent from each bar and pivotally connected to the corresponding door section to permit of the door section swinging about a vertical axis and moving with the door as the door is opened and shut, and means for holding the curtain sections in either operative or inoperative position.

5. The combination with a vehicle top and a vehicle body having the usual doors, of side curtains movable into and out of operative position and formed with special door sections, said door sections comprising upper and lower horizontally hinged frames adapted to be collapsed against each other and folded against the top, a supporting bar for each door section, a pivotal connection between one end of the supporting bar and the corresponding door section whereby the door section can swing about a vertical axis and move with the door as it is opened and closed, a projection at the opposite end of each supporting bar adapted to loosely engage the corresponding end of the door section to support the same without interfering with the outward swinging movement thereof, and means for holding the side curtain sections in either operative or inoperative position.

6. The combination with a vehicle top and a vehicle body having the usual doors, of side curtains movable into and out of operative position and including special door sections, said door sections comprising upper and lower horizontally hinged frames which are adapted to be folded against each other and swing against the top, a supporting bar for each door section, a pivotal connection between one edge of each door section and its supporting bar permitting the door section to swing about a vertical axis and move in and out with the opening and closing of the door, a lateral arm carried by the supporting bar and loosely engaging the opposite edge of the door section without interfering with the swinging of the door section with the door, and means for locking the door section in engagement with the said lateral arm when the door section is collapsed.

7. The combination with a vehicle top and a vehicle body having the usual doors, of side curtains movable into and out of operative position and including special door sections each of which is formed with upper and lower horizontally hinged frames adapted to be collapsed against each other and folded against the top, a supporting bar for each door section, a pivotal connection between one edge of each door section and the supporting bar, whereby the door section can swing about a vertical axis and move in and out with the opening and closing of the door to which it is attached, a lateral arm carried by the supporting bar and loosely engaging the opposite edge of the door section so as not to interfere with the movement of the door section with the vehicle door, a latch means for locking the door section in engagement with the lateral arm when the door section is folded, and means for holding the curtains in either operative or inoperative position.

8. The combination with a vehicle top and a vehicle body having the usual doors, of side curtains movable into and out of operative position and including special door sections each of which is formed with upper and lower horizontally hinged frames adapted to be collapsed against each other and folded against the vehicle top, a supporting bar for each of the door sections, said supporting bars being bodily movable up and down and mounted to turn about horizontal axes, a hanger pendent from each supporting bar and pivotally engaging an edge of the door section to permit the door section to swing about a vertical axis and move in and out with the opening and closing of the door to which it is attached, a lateral arm carried by the supporting bar and loosely engaging the opposite edge portion of the door section, a latch member controlled by the bodily up and down movements of the supporting bar and acting automatically to hold the door section in engagement with the lateral arm when the door section is folded, and means for holding the section in either operative or inoperative position.

9. The combination with a vehicle top, of a side curtain adapted to be folded and collapsed against the top, a casing within the top to receive the collapsed side curtain, said casing including an upper frame member and a lower cover flap normally tensioned to a closed position, a supporting bar for the curtain, means for mounting the supporting bar upon the upper frame of the casing whereby it can move bodily up and down and turn about a longitudinal axis, means for connecting said curtain to the bar for movement about a vertical axis and disposed to be controlled by said up and down movement of the bar, and means for locking the cover flap in operative position.

10. The combination with a vehicle top, of a side curtain adapted to be collapsed and folded against the top, a casing within the top to receive the collapsed side curtain, a supporting bar for the curtain, means for connecting said curtain with said bar for relative movement with a vehicle door, means for mounting the supporting bar upon a longitudinal axis, and for vertical movement transversely thereto, and means for retaining the curtain upon said bar disposed to be actuated by the vertical movement thereof.

11. The combination with a vehicle top, of a side curtain section adapted to be collapsed and folded against the top, a casing within the vehicle top adapted to receive the collapsed curtain and including a frame and a cover flap, a supporting bar for the curtain, means for connecting the curtain to the supporting bar so that the curtain can swing about a vertical axis when it is lowered, and means for connecting the bar to the frame of the casing so that the bar is bodily movable up and down and can turn about a longitudinal axis, the cover flap being movable into and out of operative position as the curtain is raised or lowered.

In testimony whereof I affix my signature.

HARRIS W. TINKER, Jr.